July 24, 1928. Re. 17,049

G. S. WITHAM, JR

MOISTURE INDICATING AND RECORDING

Original Filed Jan. 26. 1922 5 Sheets-Sheet 1

INVENTOR:
George S. Witham Jr.
BY
Alfred S. Barger
ATTORNEY

July 24, 1928. Re. 17,049

G. S. WITHAM, JR

MOISTURE INDICATING AND RECORDING

Original Filed Jan. 26. 1922 5 Sheets-Sheet 2

INVENTOR:
George S. Witham, Jr.
BY
Alfred Burger
ATTORNEY

July 24, 1928. Re. 17,049
G. S. WITHAM, JR
MOISTURE INDICATING AND RECORDING
Original Filed Jan. 26, 1922 5 Sheets-Sheet 3
Fig. 3
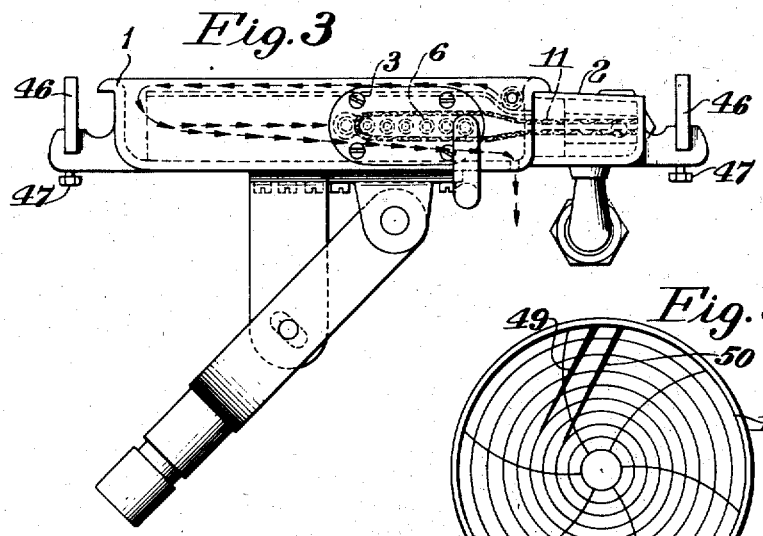
Fig. 9
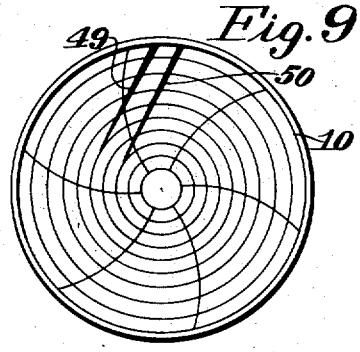
Fig. 4
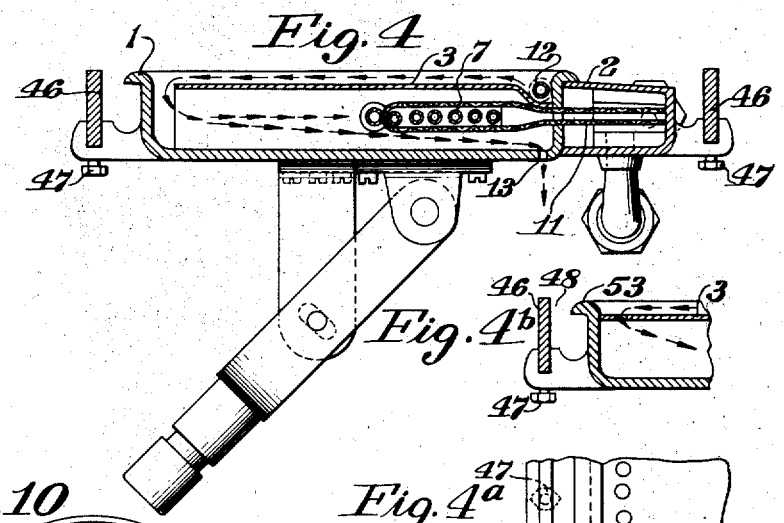
Fig. 4b
Fig. 4a
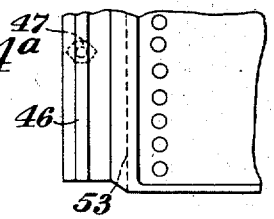
Fig. 10
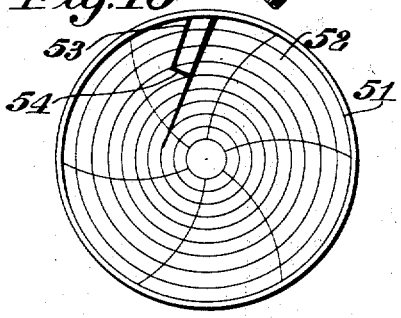
INVENTOR:
George S. Witham, Jr.
BY
Alfred Dunger
ATTORNEY July 24, 1928. Re. 17,049

G. S. WITHAM, JR

MOISTURE INDICATING AND RECORDING

Original Filed Jan. 26, 1922 5 Sheets-Sheet 4

INVENTOR:
George S. Witham, Jr.
BY
Alfred S. Barger
ATTORNEY

July 24, 1928. Re. 17,049
G. S. WITHAM, JR
MOISTURE INDICATING AND RECORDING
Original Filed Jan. 26, 1922 5 Sheets-Sheet 5
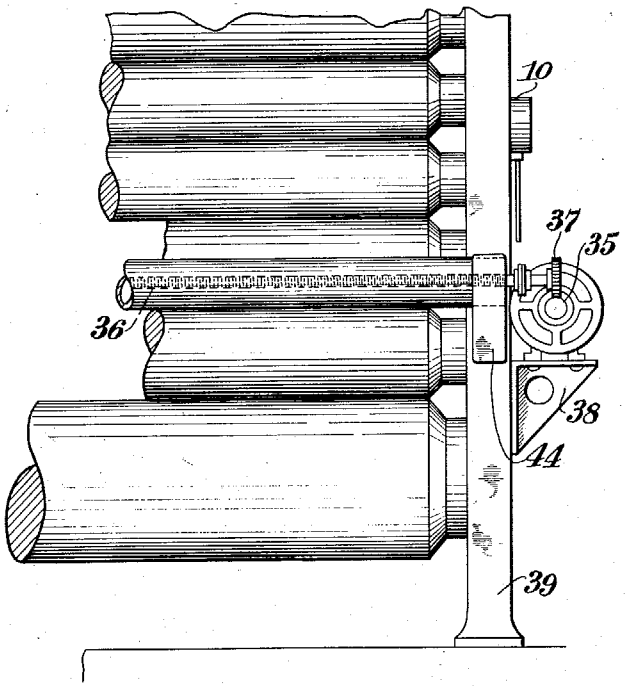
Fig. 6
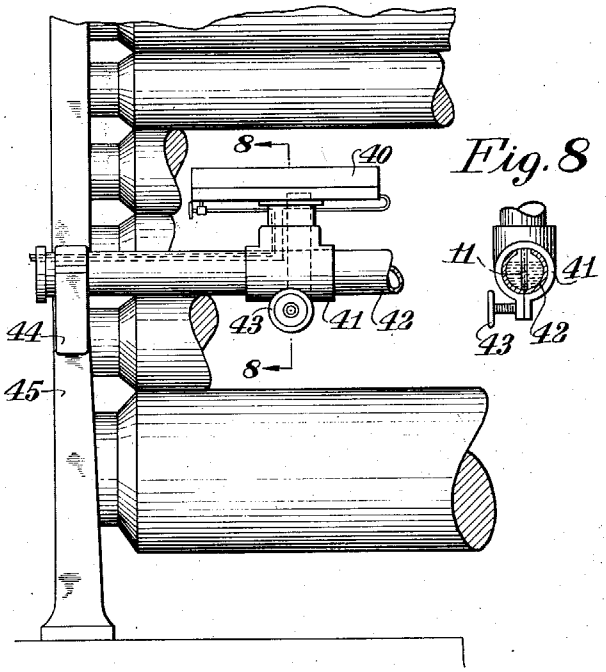
Fig. 7
Fig. 8
INVENTOR:
George S. Witham, Jr.
BY
Alfred L. Barger
ATTORNEY Reissued July 24, 1928. Re. 17,049

UNITED STATES PATENT OFFICE.

GEORGE STANFORD WITHAM, JR., OF HUDSON FALLS, NEW YORK.

MOISTURE INDICATING AND RECORDING.

Original No. 1,626,060, dated April 26, 1927, Serial No. 531,863, filed January 26, 1922. Application for reissue filed April 2, 1928. Serial No. 266,738.

My invention is an improvement in devices for measuring moisture content and relates more particularly to methods and mechanism for measuring moisture content of solid materials, such for example, as textile paper or other sheets or webs. For example, in paper making by the usual method, the amount of heat required for the proper drying is arbitrarily determined, in accordance with the grade of paper being made, and the regulation of the heat is controlled by the back tender, who judges the moisture content of the web by the feel of the same, and the amount of steam admitted to the dryer, and the consequent temperature maintained therein, is regulated in accordance with his judgment. Obviously only a small proportion of the area of the web coming from the dryer can be tested, and the temperature of the dryer, and the final condition of the web, will be determined by the condition of a portion of the web which may be abnormally dry, or abnormally wet. In the former case the web will not be sufficiently dry, while in the latter it may be overdried, giving in either case an inferior product. In any event, the regulation is uncertain, and is dependent on the skill and experience of the back tender, and on his ability to judge the moisture content by the feel of the web. The web for this reason reaches the calender rolls in a condition, as regards moisture content, that is largely dependent on chance.

It has been proposed to control the admission of steam to drying rolls by the temperature of the rolls, thereby to maintain a uniform temperature throughout the drying operation, determined as to degree by the grade of paper being made. The moisture content of a web of a selected grade, is not however a constant factor, varying in accordance with many conditions, among which may be mentioned atmospheric. Hence a temperature that will properly dry a selected grade of paper under certain conditions at one time, may be insufficient, or may be more than sufficient, under other conditions. It is obvious that with a known humidity, the requisite temperature for proper drying can be easily determined, and maintained regardless of varying conditions.

In accordance with the present invention, the moisture content of an object, such as a travelling web of material, is ascertained by passing air or a suitable other gas over a section of the surface of the object and such gas will take up from the object more or less moisture depending upon the moisture content of the surface of the object. Then by ascertaining the moisture content of the gas after such contact with the object, a reliable indication of the moisture content of the object may be obtained. By applying such tests to different sections of the surface of the object through the movement of the object or by moving the point of application of the gas, one may obtain a means estimate of the free moisture content of the object. Thus, in connection with tests upon travelling paper webs, for example, the moisture condition may be different in the center of the web than at the sides and by taking tests at both the center and sides of the web, an accurate average may thus be determined.

In the drawings;

Figure 1 is a side view of a part of a paper making machine, showing the application of the tester, Figure 2 is a bottom plan view of an embodiment of tester, Figure 3 is an end view of the same, Figure 4 is a transverse vertical section.

Figure 4ª is a top plan view of a portion of a modified form of tester. Figure 4ᵇ is a vertical section view of the parts shown in Figure 4ª.

Figures 6 and 7 are similar views showing alternate mountings,

Figure 8 is a section on the line 8—8 of Figure 7,

Figure 9 is a front view of the indicating and recording mechanism,

Figure 10 is a similar view of a modified construction.

By way of example, the invention will be described as applied to the paper making industry, but it is to be understood, of course, that the invention is capable of use in various other applications.

Figure 1:
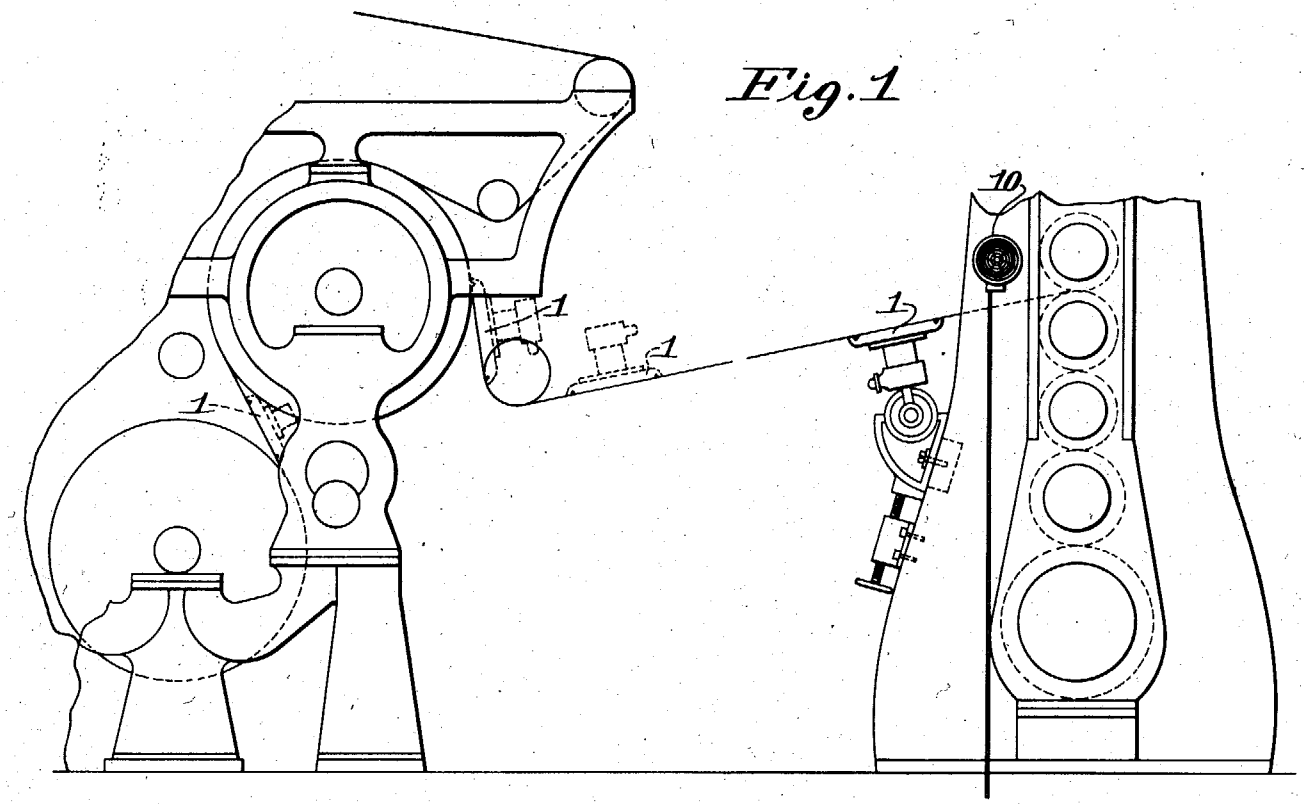
Figure 2:
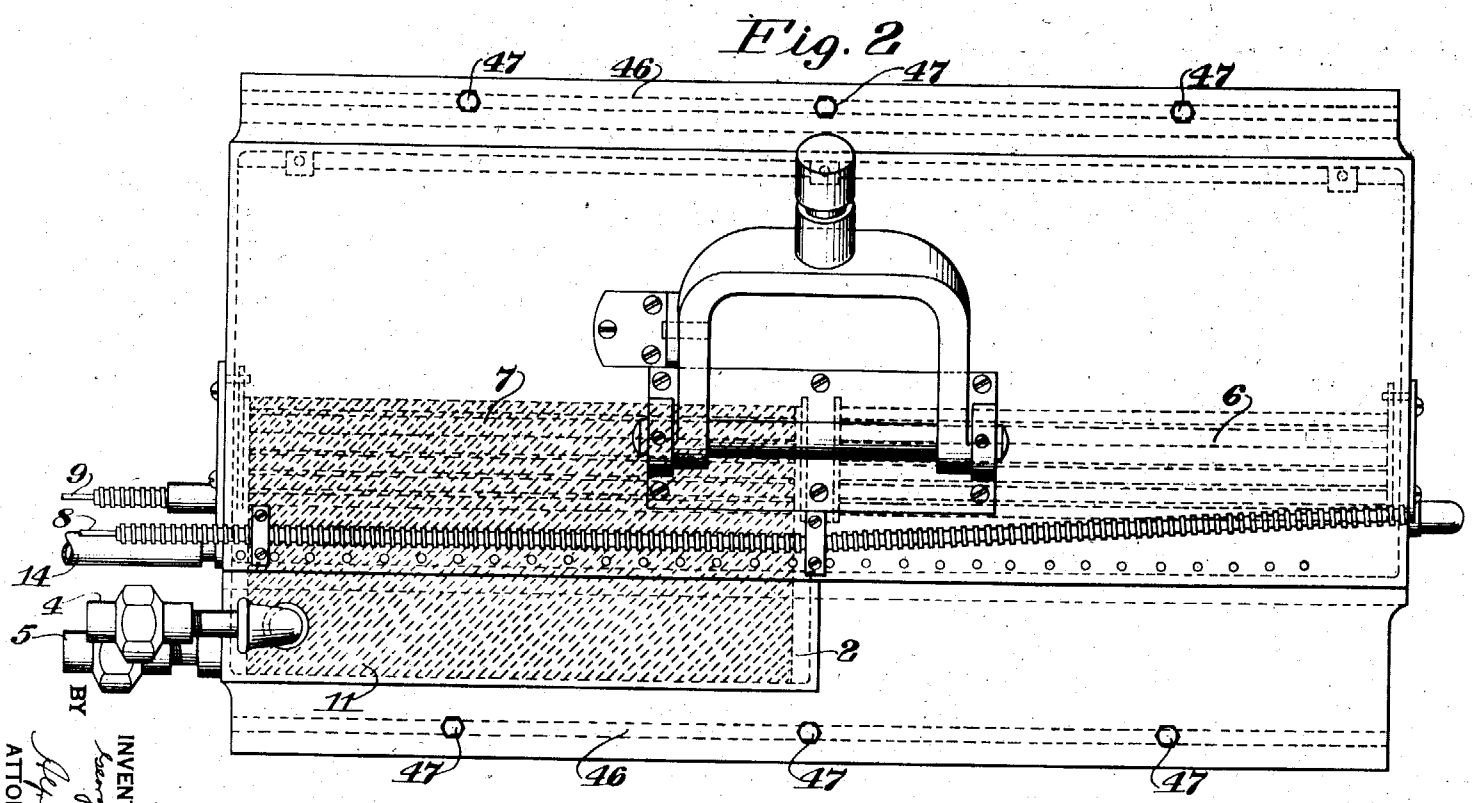

In paper making by the usual process, as before stated, the admission of steam to the drying rolls, that provides the heat of the drying mechanism, is regulated in accordance with the opinion of the back tender, as regards the moisture content of the paper. He judges wholly by the sense of touch, and can touch only a limited area of the web being dried. In the place of this uncertain and variable test, I provided a testing device, which will give a more reliable and accurate indication of the condition of the web. Such a testing device may be made adjustable across the web or over either or both faces thereof, and may be located at any point between the paper making machine and the calender rolls or reel. Suitable recording means may also be associated with the device for making permanent records automatically of the results of the tests. As shown in Figure 1, the testing device, may be arranged at any desired point. A preferred position is adjacent to the calender rolls as shown. The testing device which may be supported in any desired manner, and moved by any approved mechanism, comprises, as shown, in Figures 2, 3 and 4, an open pan 1, having at the rear thereof a reservoir 2, for water. The pan, which is of any preferred dimensions, has at the open top thereof a transversely extending plate 3, and the said plate is spaced apart from that wall of the pan remote from the tank as shown, or perforations may be provided at this point as shown in Figures 4ᵃ and 4ᵇ, for a purpose to be presently described. The tank is supplied with water by any suitable mechanism, which is connected thereto by inlet and outlet pipes 4 and 5, and a substantially constant level of water is maintained therein. The dry and wet bulbs, 6 and 7 respectively, are similar, each consisting of a series of tubes arranged alongside of each other, and each series of tubes is connected by a flexible tube 8 or 9 as the case may be, with recording mechanism indicated generally at 10. A wick 11 encloses the tubes of the wet bulb 7, and the ends of the wick, as shown in Figure 4, extend through a slot in the side wall of the pan adjacent to the tank, and into the liquid in the tank. By capillary attraction, a constant supply of liquid is carried to the wet bulb ond evaporated, more or less swiftly, in accordance with atmospheric conditions. The paper web to be tested passes over the open top of the pan, being spaced above the plate 3, and in order to provide for a uniform and homogeneous mixture of air at the face of the web being tested, I arrange a perforate pipe 12 at that wall of the pan adjacent to the tank, and just below the level of the top of the plate 3. Referring to Figure 4, it will be seen that the rear edge of the plate is offset downwardly to extend beneath this pipe, and the pipe delivers gas between the web and the plate 3 moving toward the opposite edge of the pan. Here the gas passes between the edge of the plate and the pan wall, and beneath the plate, and passes out through ports 13 at that wall of the pan adjacent to the pipe 12. Any character of gas suitable for the purpose may be used, and because of this moving current there is a uniform and homogeneous mixture at that face of the web being tested. The current of gas may be supplied by any suitable mechanism, through connections indicated at 14.

Thermostatic bulbs 6 and 7 may be of any standard form and they may be suspended within the interior of the instrument, the two sets of bulbs being independent of each other. The bulbs 6 are adapted, by means of flexible tubing, to indicate dry temperatures. The bulbs 7, in contact with the wick 11 which communicates with the reservoir 2, indicate wet bulb temperatures. When a current of gas, for example air, supplied from the tube 12, passes over the top of the instrument between the plate 3 and the web of material being tested, the gas absorbs moisture from the web of material and then follows the course indicated by the arrows in Figure 4 or Figure 4ᵇ, and comes in contact with the wet and dry bulbs. For a given dry bulb temperature, the wet bulb indication will be higher when the current of gas is comparatively dry, than when this current is quite moist. By using standard tables, either the relative or the absolute humidity may be determined, depending upon whether unconditioned or conditioned gas is used with the tester.

In operation, when the web of paper to be tested is over the open side of the pan, the moisture content thereof will affect the evaporation at the wet bulb, while the temperature will affect the dry bulb. By a comparison of the wet and dry bulb readings, and the use of charts and tables one may ascertain the humidity of the gas or air. The recording mechanism 10 records the results of the indications, so that such results for any period may be easily determined. By means of the improved testing device, any part of the web may be tested, and the tester is preferably mounted so that it can be moved transversely of the web, so that the web may be tested throughout its width. In addition to recording the indications of the wet and dry bulbs, I may connect the bulbs with controlling mechanism for the dryer, as shown and described in my copending application, Serial No. 537,328, filed Feb. 17, 1922, so that the dryer is controlled by the temperature and the humidity of the web. Any preferred mechanism may be used for mounting the tester to be moved transversely of the web, and such mechanism may be arranged so that the movement of the tester is manually controlled, or automatically by the movement of the web.

In the embodiment illustrated in Figs. 4ᵃ and 4ᵇ the plate 3 is shown as extending entirely across the top of the pan 1, and a number of perforations are provided as indicated near the edge of the pan for the purpose of permitting the compressed air or other gas to pass below the plate 3, after it has been subjected to the action of the moist web of material.

Figure 5:
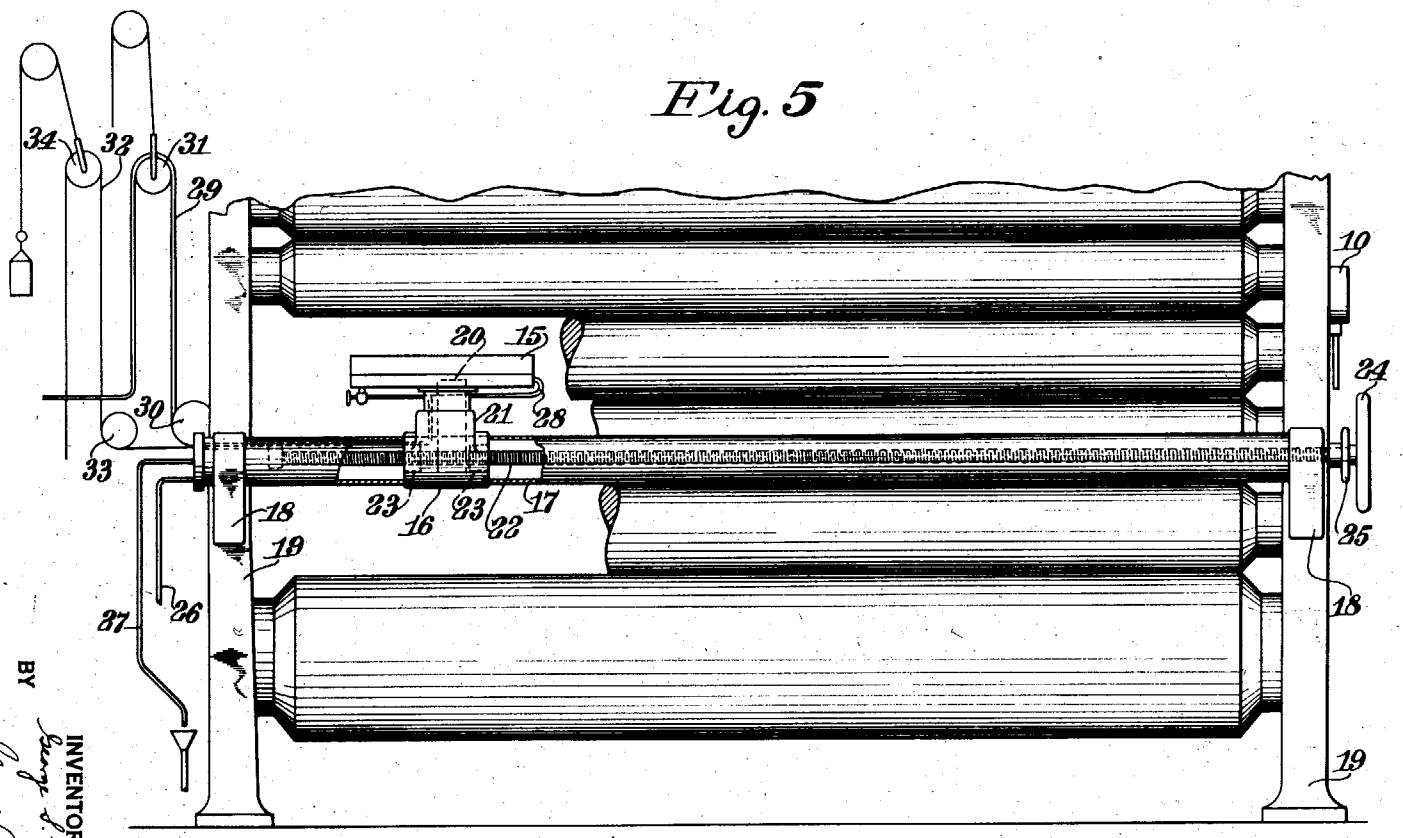
Figure 5 is a front view of a mounting for the tester.

In Figure 5, the testing device indicated generally at 15 is supported by a bearing 16, which is mounted to move longitudinally of a cylindrical reservoir 17 supported in brackets 18 on the frame 19 of the paper making machine, at any desired point on said frame, as for instance adjacent to the calender rolls. The reservoir 17 is longitudinally slotted on its upper face, and the wick 20 of the testing device extends through the slot into the water in the magazine. Referring to Figure 5, it will be noticed that the bearing 16 is a T, the lateral branch 21 thereof being the outer member of a telescoping connection, whose inner member is connected with the testing device. The members are adjustable with respect to each other, and are held in adjusted position, by any suitable means, as for instance friction between the parts. A screw 22 is journaled co-axially of the reservoir, and nuts 23 are connected with the bearing, and engage the screw, so that when the screw is turned the bearing will be moved longitudinally of said screw. A hand wheel 24 is connected with one end of the screw, and a lock nut 25 is mounted on the screw adjacent to the hand wheel, for holding the screw in adjusted position. The reservoir is adjustable angularly in the brackets 18, so that the angle of the open top of the tester with respect to the horizontal may be varied, and the adjustment at 21 permits the tester to be moved nearer to or farther away from the reservoir. Water is supplied to the reservoir by means of a pipe 26, and an overflow 27 is provided, at the level at which it is desired to maintain the liquid in the reservoir. The pipe 28 which supplies the gas to the tester is connected by a flexible pipe 29 with a suitable source of supply. This pipe passes under a pulley 30 on the machine frame, and over a counter-weighted pulley 31 above the pulley 30. The flexible tubes 32 which connect the bulbs with the recording mechanism pass around similar pulleys 33 and 34, and it will be obvious that when the tester moves away from the source of gas supply and from the recording instrument, the pulleys 31 and 34 will be moved downward, while when the tester moves toward the source of gas supply, the pulleys will move upward, taking up the slack in the hose and the tubes. With this arrangement, as the web travels toward the calender rolls, the tester may be moved transversely thereof, at suitable intervals, to test the web throughout its width.

In Figure 6, a construction is shown, wherein the tester is moved by an electric motor indicated at 35, the said motor being geared to the screw 36 which moves the tester, by a worm gear connection indicated at 37. The construction is otherwise the same as that shown in Figure 5, and the motor may be arranged to operate continuously, and to move the tester continuously from side to side of the web, or it may be arranged to operate at intervals, to move the tester at specified intervals over selected distances. The motor is mounted on a bracket 38 supported by the frame 39 of the machine.

In Figures 7 and 8 there is shown an embodiment, wherein the tester 40 is connected with the bearing 41 in the usual manner, which in turn is mounted to move on the reservoir 42. The bearing however, is a split bearing, and it may be clamped on the reservoir, by means of a set screw 43, whereby to hold it in adjusted position. With this arrangement, the bearing may be adjusted angularly on the reservoir, as well as longitudinally thereof, and by means of the set screw 43 may be held in adjusted position. The reservoir is mounted in brackets 44 on the frame 45 of the paper making machine. In Figure 9 the indicating and recording mechanism for the wet and dry bulb temperatures is shown. The said mechanism indicated at 10 is of usual construction, having hands or pointers 49 and 50, for indicating and recording the wet and dry bulb temperatures on cards, which are mounted behind the transparent front of the case. Each pointer carries a pen, which traces a line on the card, and the cards are appropriately marked so that the variations in the lines traced may be easily determined. The line traced by the pointer 50 records the temperature, while that traced by the pointer 49, when considered in conjunction with that traced by pointer 50, gives an indication of the humidity, and by proper regulation, the lines traced by the pens may be caused to maintain any desired relation.

In Figure 10 there is shown an alternate form of indicating and recording mechanism, wherein a single pen or pointer is used. In this arrangement, the case 51 corresponds to the case 10 of Figure 9. The recording pen or pointer 52 may be coupled with either of the bulbs, in the present instance with the dry bulb. The wet bulb is coupled with an arm 53, and the arm and the pen are connected by a link 54 which is pivoted to the pen, and has a pin and slot connection with the arm. With this arrangement a mean curve is traced, the shape of the curve depending upon both the temperature and the humidity of the web of material being tested. By properly regulating the temperature, the mean line may be caused to be traced at the desired point.

Ordinarily there is a considerable quantity of fuzz on the face of the web and this fuzz is scraped off by the edges of the pan, and to facilitate its removal from the pan, I hinge the plate 3 to the pipe 12 as shown, so that the plate may be lifted at the edge remote from the pipe to permit the cleaning of the pan. I also arrange scrapers 46 at opposite sides of the pan, the said scrapers being adjustable vertically as shown at 47, and I preferably arrange the scrapers so that the web is held slightly above the edges of the pan and does not contact therewith. The scrapers are of a length corresponding to the length of the pan and it will be noticed that there is a recess indicated at 48 between each scraper and the pan for catching the fuzz which is removed by the scraper.

It will be understood that the invention is equally applicable to other objects, such as textile webs for example, and that various changes in the details which have been herein described and illustrated in order to explain the nature of the invention may be made by those skilled in the art within the principle and scope of the invention as expressed in the appended claims.

I claim:

1. In paper making machines, a humidity and temperature indicating and recording device including wet and dry bulb elements, and means for moving said elements across and adjacent to a face of the web of paper to indicate and record the humidity and temperature at any desired point along such face.

2. In mechanism for measuring the moisture content of a material, the combination of containing means adapted to confine gas in contact with a portion of said material separately from the atmosphere surrounding said material, means for directing a current of gas through said containing means for contact with said portion of the material, and humidity measuring means comprising a sensitive element arranged in said current of gas beyond the region of contact of the latter with said material.

3. In paper making machines, a humidity and temperature indicating and recording device including wet and dry bulb elements, means for moving said elements across and adjacent to a face of the web of paper, means for directing a flow of gas at the face of the web adjacent to said elements, and means for causing this gas to come in contact with the wet and dry bulb elements.

4. In paper making machines, a humidity and temperature indicating and recording device including wet and dry bulb elements, means for moving said elements adjacent to a face of said web, means for directing a flow of gas at the face of the web adjacent to the said elements, means for causing this gas to come in contact with said elements and for shielding the said elements from the current of gas until after it has come in contact with the web of paper.

5. A humidity and temperature indicating and recording device for paper making machines, comprising a tester, carrying a wet bulb and a dry bulb indicating and recording mechanism; means connecting said mechanism with said bulbs whereby the humidity and the temperature are recorded; and means for supporting the tester to permit movement thereof transversely of the traveling web and adjacent thereto.

6. In a humidity and temperature indicating and recording device for paper making machines, an open pan, wet and dry bulb elements carried by said pan, a wick associated with the wet bulb element, and means for supporting and moving said pan adjacent to one face of the web of paper. said means including a reservoir extending transversely of the web and into which said wick is adapted to extend.

7. In a humidity and temperature indicating and recording device for paper making mechines, an open pan, wet and dry bulb elements carried by said pan, a wick associated with the wet bulb element, and means for supporting and moving said pan adjacent to one face of the web of paper, said means including a reservoir extending transversely of the web and into which said wick is adapted to extend, a screw mounted to rotate within the reservoir, and a nut on the pan engaging the screw for moving said pan when the screw is turned.

8. In a humidity and temperature indicating and recording device for paper making machines, a wet bulb element and a dry bulb element, a wick associated with the wet bulb element, and means for supporting and moving said elements across one face of the web of paper, said means including a reservoir extending transversely of the web and into which said wick is adapted to extend.

9. In a humidity and temperature indicating and recording device for paper making machines, a wet bulb element and a dry bulb element, a wick associated with the wet bulb element, and means for supporting and moving said elements across one face of the web of paper, said means including a reservoir extending transversely of the web and into which said wick is adapted to extend, a screw mounted to rotate within the reservoir, and a nut associated with the screw for moving the elements when the screw is turned.

10. In a humidity and temperature indicating and recording mechanism for paper making machines, an open pan adapted to be arranged with its open side adjacent to the web of paper, wet and dry bulb elements carried by said pan, means for directing a current of gas adjacent to the face of the web and flowing from one side of the pan to the other, and means for thereafter causing said current of gas to come in contact with the wet and dry bulb elements, whereby these elements are caused to respond to changes in humidity and temperature.

11. In mechanism for measuring the moisture content of a material, the combination of an open sided container having its open side arranged against and substantially closed by the surface of said material for confining a current of gas in contact with said material separately from the atmosphere surrounding said material, means for directing a current of gas through said container, and humidity measuring means comprising wet and dry sensitive elements arranged in said gas current beyond the region of contact of the latter with said material.

12. In a humidity and temperature indicating and recording device for paper making machines, an open pan adapted to be moved adjacent to one face of the web, wet and dry bulb elements mounted within said pan, a plate in the pan spaced apart from one edge thereof to provide a space between the web and the plate, and means for directing a flow of gas into the space between the web and the plate, the said plate being arranged so thereafter as to cause the gas to come in contact with said elements whereby said elements are caused to respond to changes in wet and dry bulb temperatures.

13. In a device of the character specified, the combination with the frame of a paper making machine of a reservoir supported transversely thereof, humidity and temperature indicating and recording mechanism including wet and dry bulb elements mounted on the reservoir, a wick for the wet bulb element, means for moving the said mechanism longitudinally of the reservoir from side to side of the frame, the wick of the wet bulb element dipping into the reservoir.

14. In a device of the character specified, the combination with the frame of the paper making mechanism, of a reservoir supported transversely thereof, humidity and temperature indicating and recording mechanism including wet and dry bulb elements mounted on the reservoir, means for moving the said mechanism longitudinally of the reservoir from side to side of the frame, means in connection with the said mechanism for directing a flow of gas onto the face of the web adjacent to the said mechanism, flexible connections between said means and a source of supply, and counter-weighted mechanisms for retaining said flexible connections taut during the movement and the tester.

15. In paper making machines, humidity and temperature indicating and recording devices adapted to be moved adjacent to a face of the web to indicate and record the humidity and temperature at such face, and means for homogenizing the atmosphere between said devices and the face of the web.

16. In paper making machines, humidity and temperature indicating and recording devices adapted to be moved adjacent to a face of the web to indicate and record the humidity and temperature at such face, and means for homogenizing the atmosphere between said devices and the face of the web, comprising means for directing a uniformly distributed current of gas against the face of the web adjacent to the said devices.

17. A material testing mechanism of the character described, comprising a conductor for gas having an opening arranged adjacent and adapted to be substantially closed by a portion of the surface of said material for subjecting a current of gas passing through said conductor to intimate contact with said material, means for conducting gas to said conductor for passage therethrough and humidity measuring means adapted to be subjected to said current of gas after contact of the same with said material.

18. In a machine of the character described, wherein a web of paper or the like is caused to travel over drying rolls, means for determining the moisture content of the web at a predetermined point along the path of motion thereof, comprising mechanism responsive to variations in humidity conditions of air, conducting and circulating means for maintaining a flow of gas past said point and thence to the responsive means and including confining means disposed at said point for bringing the gas throughout a constant area into contact with the surface of the traveling web.

19. In a machine of the character described, wherein a web of paper or the like is caused to travel over drying rolls, means for determining the moisture content of the web at a predetermined point along the path of motion thereof, comprising mechanism responsive to variations in humidity conditions of air, conducting and circulating means for maintaining a confined flow of gas past said point and thence to the responsive means and including confining means disposed at said point for bringing the gas into contact with a constant area of the surface of the traveling web.

20. In a machine of the character described, wherein a web of paper or the like is caused to travel over drying rolls, means responsive to variations in humidity condition of air, a separate source of air, means for conducting a current of air from the separate source and so as to contact with a constant area of the traveling web at a predetermined point along the path of motion thereof and thus to absorb moisture from the web and a conduit for passing moisture-charged air from said current to the responsive means.

21. In a machine of the character described, wherein a web of paper or the like is caused to travel over drying rolls, means responsive to variations in humidity conditions of the air, a separate source of air means for conducting a current of air from the separate source into contact with the web to absorb moisture therefrom, said conducting means including means for limiting contact to a constant area of the web and a conduit for passing moisture-charged air from said limiting means into contact with said humidity-responsive means.

In testimony whereof I affix my signature.

GEORGE STANFORD WITHAM, Jr.